F. W. MEYER.
FREQUENCY CHANGER.
APPLICATION FILED NOV. 15, 1917.

1,394,325.

Patented Oct. 18, 1921.
4 SHEETS—SHEET 1.

Inventor
Friedrich W. Meyer
By Edwin B. H. Tower Jr. Atty.

F. W. MEYER.
FREQUENCY CHANGER.
APPLICATION FILED NOV. 15, 1917.

1,394,325.

Patented Oct. 18, 1921.
4 SHEETS—SHEET 3.

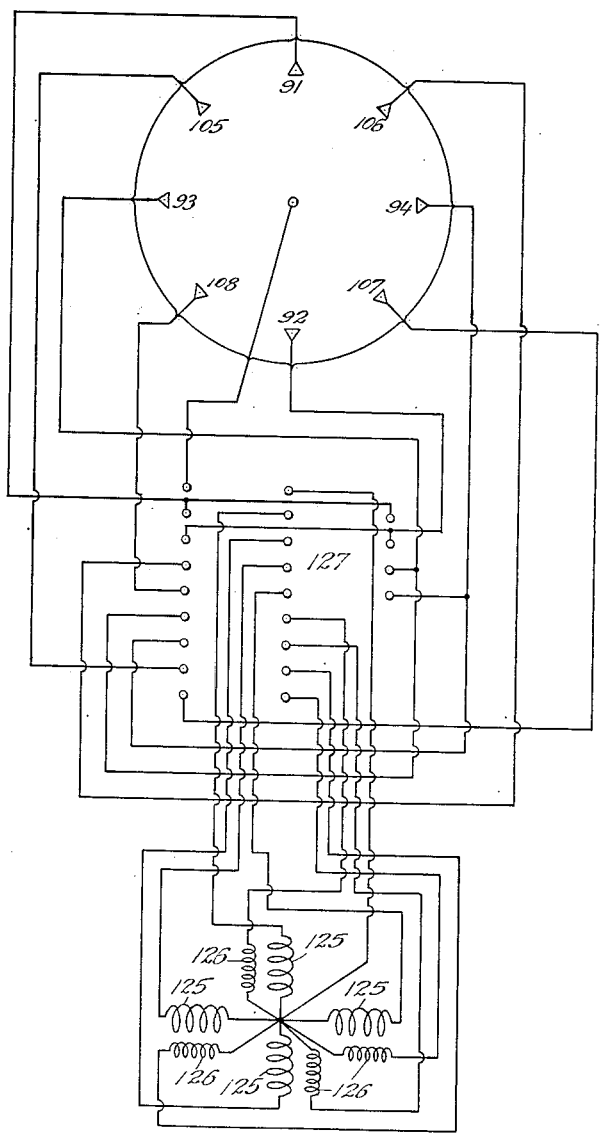

UNITED STATES PATENT OFFICE.

FRIEDRICH WILHELM MEYER, OF MILWAUKEE, WISCONSIN, ASSIGNOR TO THE CUTLER-HAMMER MFG. CO., OF MILWAUKEE, WISCONSIN, A CORPORATION OF WISCONSIN.

FREQUENCY-CHANGER.

1,394,325.   Specification of Letters Patent.   Patented Oct. 18, 1921.

Application filed November 15, 1917. Serial No. 202,191.

*To all whom it may concern:*

Be it known that I, FRIEDRICH WILHELM MEYER, a citizen of the German Empire, residing at Milwaukee, in the county of Milwaukee and State of Wisconsin, have invented new and useful Improvements in Frequency-Changers, of which the following is a specification.

This invention relates to a frequency changer.

One of the objects of the invention is to provide an improved method and means for producing, from an alternating current of one frequency, an alternating magnetic flux of a different frequency.

Another object is to provide an improved method and means for changing an alternating current of one frequency into an alternating current of a different frequency.

Another object is to provide means for efficiently producing an alternating magnetic flux or current from an alternating current of a different frequency.

Another object is to provide comparatively small, simple and static means for producing these results.

Other objects and advantages will appear from the following specification and claims.

The accompanying drawings illustrate diagrammatically some of the means for carrying out the method and some of the uses to which it may be applied.

In the drawings—

Fig. 10 shows how a two phase double frequency flux may be produced directly in the windings of a motor.

The preferred embodiment of the methods, hereinafter more fully described, consists in rectifying polyphase alternating currents and combining the effects of the rectified pulsations to produce a resultant alternating magnetic flux whose frequency is different from that of the source. From this resultant flux an alternating current of similar frequency may be produced.

Figure 1:
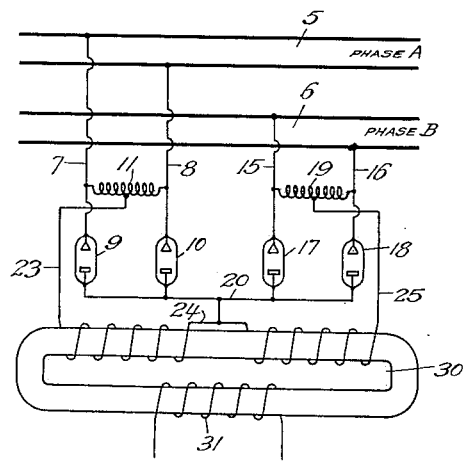
Figure 1 illustrates means for producing, from a two phase alternating current, an alternating magnetic flux or current of double the frequency.

Fig. 1 shows connections for a two phase alternating current system wherein the mains are designated by the numerals 5 and 6. Conductors 7 and 8 leading from main 5, respectively pass to terminals of a pair of current rectifiers 9 and 10, which may take the form of electroionic valves. A suitable inductance 11, such as an autotransformer, is bridged across conductors 7 and 8. Similarly for the main 6 of the other phase, a pair of conductors 15 and 16 lead respectively to terminals of current rectifiers 17 and 18, and a suitable inductance 19 is bridged across conductors 15 and 16. The rectifiers 17 and 18 are similar to rectifiers 9 and 10 and may likewise take the form of electroionic valves. The opposite terminals of the rectifiers are connected to a common conductor 20. The middle point of inductance 11 is connected by a conductor 23 to one outside terminal of an inductive winding 24, the other outside terminal of winding 24 being connected by conductor 25 to the middle of inductance 19. Conductor 20 is connected to the middle point of winding 24.

Winding 24 is represented as being wound upon the iron core and forming the primary of a recombining transformer 30 which has a secondary winding 31. As will be later pointed out however the primary inductive winding may be used for other purposes than the primary of a transformer.

Figure 2:
Fig. 2 is a graphic representation of the two phase alternating current from the source.
Figure 3:
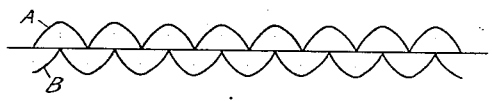
Fig. 3 is a graphic representation of the rectified currents.
Figure 4:
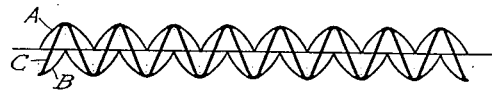
Fig. 4 is a graphic representation of the rectified currents, or magnetomotive forces produced thereby, and the resultant magnetomotive force or magnetic flux.
Figure 5:
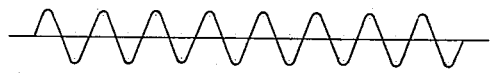
Fig. 5 represents a current produced by the resultant magnetic flux.

The two phases of the alternating current carried by mains 5 and 6 may be respectively represented by curves A and B of Fig. 2. The rectifiers 9 and 10 rectify the currents of main 5 and rectifiers 17 and 18 rectify the currents of main 6 so that the left hand and right hand sections of winding 24 are traversed by unidirectional current pulsations represented by curves A and B respectively of Fig. 3. These current pulsations produce unidirectional pulsatory magnetomotive forces in the core of transformer 30 which may also be represented by curves A and B of Fig. 3. The magnetomotive forces are in opposite directions and being displaced 90 electrical degrees, combine as shown in Fig. 4 to produce a resultant alternating magnetic flux in the core of the transformer which may be represented by curve C of Fig. 4. It will be readily seen that this flux being the resultant of the two displaced pulsatory magnetomotive forces has a frequency double that of the current flowing to the rectifiers. The resultant flux created by winding 24 induces an alternating current in secondary 31 of corresponding frequency and displaced therefrom or out of phase 90 electrical degrees. This induced current is graphically represented by the curve of Fig. 5 and also has a frequency double that of the source.

The rectifiers have all been illustrated as being of the arc or valve type, such, for example, as the mercury arc rectifier, high vacuum or hot cathode valves, but it will be readily understood that any other type of rectifier may be used. For example the rectifiers may be of the well known electrolytic type.

Figure 6:
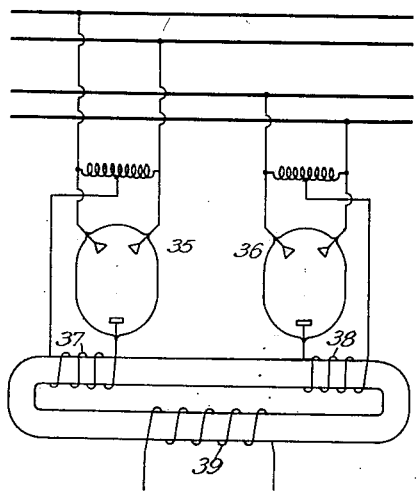
Figs. 6 and 7 illustrate modified means for carrying out the method of producing, from a two phase source, a single phase flux or current of a frequency different from the source.

In Fig. 6 the rectifiers for each phase have been confined in one electroionic valve having two discharge paths but the function and operation is the same as described for Fig. 1. It will also be noted that the inductive winding for creating the pulsating magnetomotive forces has been divided into two separate sections but as will be readily understood the action is the same as when a continuous winding is used. Rectifier 35 rectifies the alternating current of one phase into unidirectional pulsations which flow through winding 37 and which are likewise graphically represented by curve A of Fig. 3. Rectifier 36 in a similar manner changes the alternating current of the second phase into unidirectional pulsations which are displaced from the first 90 electrical degrees and which are also represented by curve B of Fig. 3. As before these unidirectional pulsations produce pulsatory magnetomotive forces at right angles or 90 electrical degrees to each other which combine to produce a resultant flux represented by curve C. This flux is double the frequency of the current impressed upon the rectifiers and will induce in a secondary 39 an alternating current of a corresponding frequency or double the frequency of the source.

Figure 7:
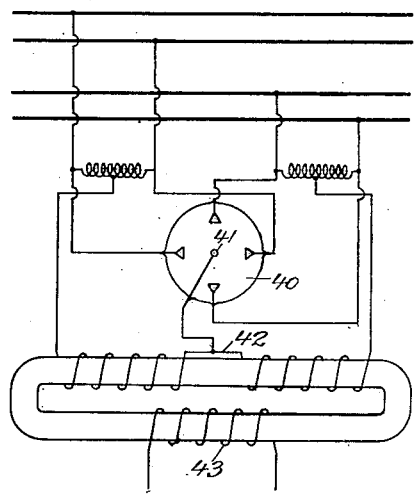

Fig. 7 shows the rectifier terminals all inclosed in one electroionic valve 40 and having a common anode 41. The pulsatory currents produced by this combined rectifier pass through a single inductive winding 42 such as illustrated in Fig. 1. The pulsatory magnetomotive forces produced by winding 42 create an alternating resultant flux of twice the frequency of the alternating current impressed on the rectifiers and this flux induces a corresponding frequency alternating current in secondary 43.

The resultant double frequency alternating flux produced as above described may be utilized wherever such a flux is desired. It may induce an alternating current of corresponding frequency by providing a suitable secondary as shown. This current may be employed to drive a motor at higher speeds than the frequency of the available source of power will permit, or for many other purposes.

Figure 8:
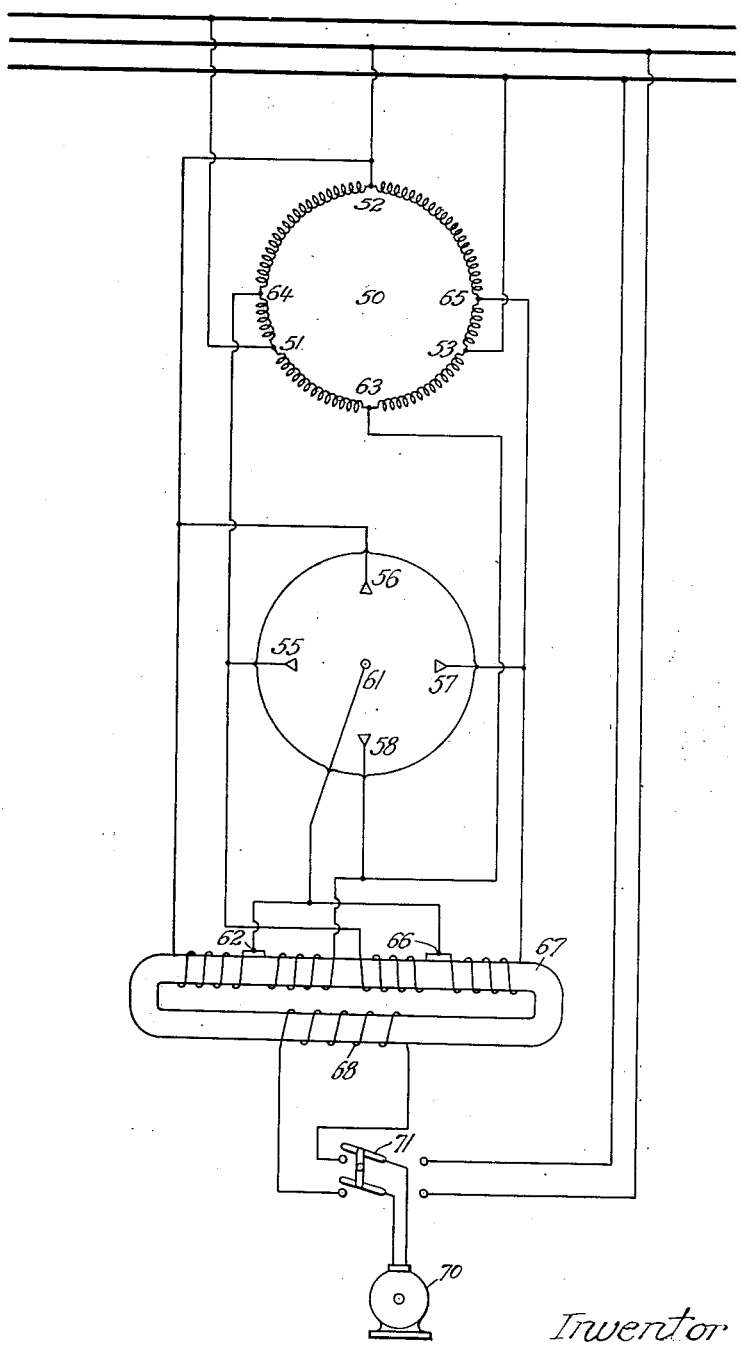
Fig. 8 illustrates means for converting a three phase alternating current into a single phase alternating current of double the frequency.

In Fig. 8 the frequency changer is shown applied to a three phase system, the resultant single phase current being utilized to drive a motor. By arranging the motor so that it may be connected either to the mains or the frequency changer different speeds may be obtained therefrom. A ring transformer or phase converter 50 of the usual well known construction is connected to the three phase mains at the points 51, 52 and 53 which are spaced 120 electrical degrees apart. As well known such a phase converter will, when properly connected, change a three phase input to a two phase output. The two phase current thus provided through the agency of the phase converter 50 is rectified in the manner heretofore explained to produce two sets of unidirectional pulsations of opposite polarity and displaced in phase 90 electrical degrees. These current pulsations produce unidirectional pulsatory magnetomotive forces which combine to form a resultant alternating flux of double the frequency of the current impressed on the rectifiers. Four rectifier terminals 55, 56, 57 and 58 are employed. They are shown placed within a single electroionic valve 60 having a common anode 61. If desired, however, each rectifier comprising two electrodes may be in a separate valve, the anodes all being connected together as in Fig. 1. Rectifier terminal 56 is connected to the phase converter 50, at point 52 and to the left hand terminal of an inductive winding 62. A point 63 on the converter 180 electrical degrees from point 52 is connected to rectifier terminal 58 and the right hand terminal of winding 62. Two other points 64 and 65 spaced from point 52 by 90 electrical degrees are connected respectively to rectifier terminal 55 and the left hand terminal of an inductive winding 66, and to rectifier terminal 57 and the right hand terminal of winding 66. The middle points of windings 62 and 66 are connected together and to the common rectifier terminal 61. With this arrangement no extra impedance is necessary to split the phases this being done by the windings 62 and 66.

The currents from the phase converter 50 are rectified by the rectifiers so that pulsatory unidirectional currents of opposite polarity flow through the two halves of each of the inductive windings 62 and 66. These pulsations produce pulsatory magnetomotive forces in the core 67 which, as before, combine to produce a resultant alternating magnetic flux of double the frequency of the current flowing to the rectifiers. This resultant flux induces a current of corresponding frequency in a secondary winding 68.

A motor 70 is connected to the middle terminals of a two point double throw knife switch 71. When the switch is thrown to the right the motor has impressed upon its windings a single phase current of the frequency of the mains while when the switch is thrown to the left the motor windings are subjected to a single phase alternating current of double the frequency of the current of the mains. In this way the motor may be readily arranged to operate at different speeds.

Figure 9:
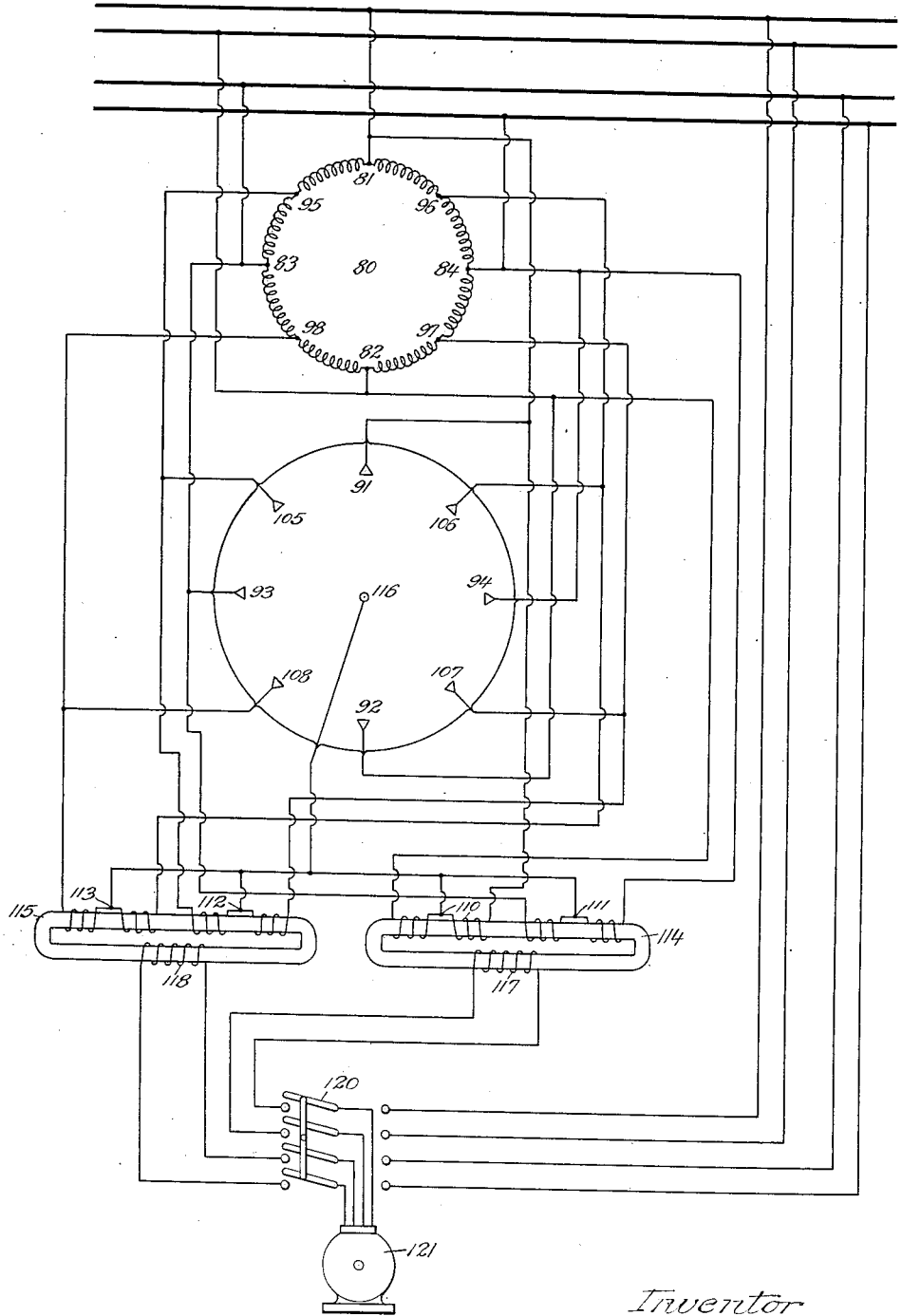
Fig. 9 illustrates means for converting two phase alternating current into two phase alternating current of double the frequency.

Fig. 9 shows rectifiers for converting a two phase current into a two phase current of double the frequency. A phase converter 80 is connected to the mains at points 81, 82, 83 and 84 spaced 90 electrical degrees apart. These points are respectively connected to rectifier terminals 91, 92, 93 and 94. Points 95, 96, 97 and 98 of the converter located midway between the other points or 45 electrical degrees therefrom are connected respectively to rectifier terminals 105, 106, 107 and 108. The converter at points 81 and 82 is also connected respectively to the right hand and left hand outside terminals of an inductive winding 110. Points 83 and 84 of the converter are also connected respectively to left hand and right hand terminals of an inductive winding 111. Points 95 and 97 of the converter are likewise connected respectively to left hand and right hand terminals of an inductive winding 112 while points 96 and 98 are connected respectively to right hand and left hand terminals of an inductive winding 113. Windings 110 and 111 are placed on the iron core of one transformer 114 while windings 112 and 113 are placed on the iron core of a separate transformer 115. The middle points of windings 110, 111, 112 and 113 are connected together and to the common rectifier terminal 116. Transformer 114 has a secondary winding 117 and transformer 115 has a secondary 118.

Through the agency of the converter two phase currents are impressed on the rectifiers where they are converted into unidirectional pulsations which traverse the windings 110 to 113 inclusive. Each winding produces unidirectional pulsatory magnetomotive forces of opposite sign and displaced 90 electrical degrees which separately combine to produce in the transformers resultant alternating magnetic fluxes which are displaced in phase 90 degrees and are double the frequency of the current impressed on the rectifiers. These resultant fluxes induce currents in the secondaries which are also displaced 90 degrees from each other and are double the frequency of the source. There is therefore available two phase fluxes or a two phase current of double frequency.

The transformer secondaries may be connected to one set of stationary contacts of a four pole double throw switch 120 the movable contacts of which are connected to a motor 121. By connecting the other stationary contacts of the switch to the line the motor may be driven at one speed from the line by throwing the switch to the right and at double speed by throwing the switch to the left.

While the rectifiers have been shown as combined in one vessel or tube it will be readily understood that eight separate complete rectifiers may be employed with the same results.

The foregoing diagrams have illustrated the application of the double frequency flux to produce a corresponding frequency alternating current which may be utilized to drive electric motors or for other purposes.

In Fig. 10 an arrangement is shown wherein the resultant flux is directly created and employed in the windings of a motor. The motor is provided with a set of main two phase windings 125 and an auxiliary set of two phase windings 126. One set is used alone when operating the motor at low frequency and both sets are employed when the motor is operating at double frequency.

The source of current for the rectifiers comprising a phase converter is not shown since it may be the same as that illustrated in Fig. 9. For convenience in following the connections the rectifier terminals in Fig. 10 have been given the same reference numerals as in Fig. 9. The rectifier terminals are connected to terminals of a double throw switch 127. The upper middle terminal of the switch is connected to the common point of the motor windings, the next four middle terminals of the switch are connected to the outside terminals of the set of main two phase windings 125 and the lower four middle terminals are connected to the outside terminals of the auxiliary set of windings 126. When the blades of switch 127 are thrown to the right the main set of motor windings are connected in the usual two phase relation to the mains, and the motor runs at a speed corresponding to line frequency. When the switch blades are thrown to the left the auxiliary and main windings are connected in precisely the same relation to the rectifiers as the transformer primary windings of Fig. 9. Pulsating magnetomotive forces are thus produced by the motor windings in the same manner as by the transformer primary windings and a resultant alternating flux is produced in the motor of double the frequency of the current impressed on the rectifiers. The motor will then operate at a speed corresponding to twice the line frequency.

It will be apparent that the systems hereinbefore described may be extended to produce higher frequencies. Thus, by connecting the recombining transformer secondaries, where, for example, double frequency current is available, to an additional set of rectifiers and transformer windings a current of four times the frequency of the source may be produced. This series arrangement of frequency changers may be extended as desired and by properly connecting the phase converter in ways well known in the art the number of phases of the resultant different frequency alternating flux or current may be varied as desired. For example two phase current may be made to provide two, three, four, etc. phase current of a different frequency.

It will also be apparent that each phase may not furnish an equal share of the power used. Thus, a simple phase alternating current system may be the main source of power supply and by having an auxiliary source of small capacity to provide, through the agency of rectifiers, the requisite additional pulsatory magnetomotive forces in the transformer or motor windings a resultant double frequency flux will be created.

What I claim is:

1. A frequency changer for changing the frequency of alternating current, comprising a pair of electroionic discharge paths for each phase for producing therefrom pulsating unidirectional currents, a transformer winding traversed by the pulsating currents to produce component pulsatory magnetomotive forces which combine to produce an alternating magnetic flux having a different frequency than the original alternating current, and a transformer secondary energized by said resultant flux and producing an alternating current having a different frequency than the original alternating current.

2. In combination with an alternating current source an electroionic valve having a pair of discharge paths for each phase for producing therefrom pulsating unidirectional currents, a transformer primary traversed by the pulsating currents to produce component pulsatory magneto-motive forces which combine to produce an alternating magnetic flux having a different frequency than the source, and a transformer secondary energized by said resultant flux and producing an alternating current having a different frequency than said source.

3. In combination with an alternating current source, an electroionic valve having a pair of discharge paths for each phase for producing therefrom pulsating unidirectional currents, and a transformer having a primary winding for each phase arranged to be traversed by the pulsating currents rectified therefrom to produce component pulsatory magneto-motive forces which combine to produce an alternating magnetic flux having a different frequency than the original alternating current and a secondary winding energized by said resultant flux and producing an alternating current having a different frequency than the original alternating current.

4. In combination with an alternating current source, stationary rectifiers for rectifying two phases thereof into pulsating unidirectional currents, a transformer primary traversed by the pulsating currents to produce component pulsatory magnetomotive forces which combine to produce an alternating magnetic flux having a different frequency than the source, and a transformer secondary energized by said resultant flux and producing an alternating current having a different frequency than said source.

In witness whereof I have hereunto subscribed my name.

FRIEDRICH WILHELM MEYER.